Aug. 4, 1953 O. H. SCHMITT 2,648,063

TRANSCEIVER SYSTEM

Filed Aug. 1, 1946

INVENTOR.
Otto H. Schmitt
BY M. O. Hayes
ATTORNEY

Patented Aug. 4, 1953 2,648,063

UNITED STATES PATENT OFFICE 2,648,063

TRANSCEIVER SYSTEM

Otto H. Schmitt, Mineola, N. Y., assignor to the United States of America as represented by the Secretary of the Navy Application August 1, 1946, Serial No. 687,656

5 Claims. (Cl. 343—179)

This invention relates to radio transmitter systems. A principal object of the invention is to provide a jammer, which is entirely automatic and effective to search out and jam a sustained radio-frequency carrier wave having a frequency value lying within a predetermined frequency range.

According to the invention, an oscillator is motor-tuned so as to sweep across the assigned frequency band cyclically, and means is provided for interrupting the sweep-tuning and causing the oscillator frequency to vacillate about a victim signal when such is detected.

The invention will be better understood from the following description and the drawing, in which.

Figure 1:
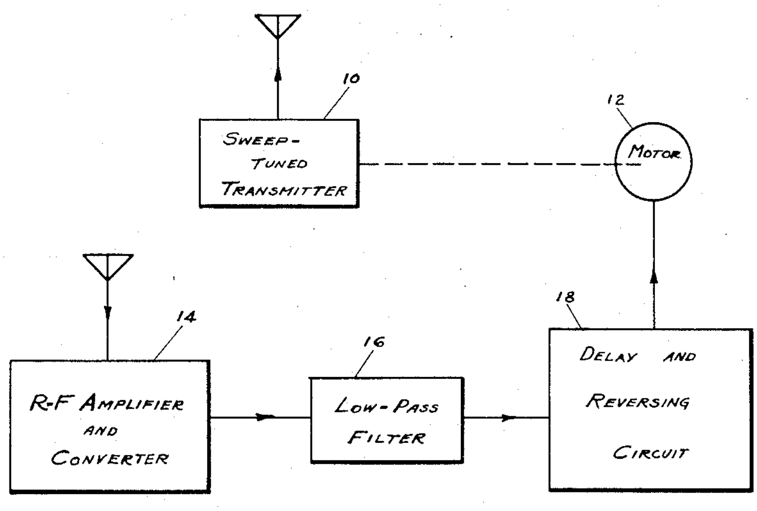
Fig. 1 is a block diagram illustrating the invention.

In Fig. 1, sweep-tuned transmitter 10 includes a tuning capacitor or equivalent (not shown) cyclically operated by motor 12 so as to sweep back and forth across the alloted band. A receiver is provided comprising an R.-F. broad-band amplifier (or one that is tuned coordinately with the transmitter) and converter 14 and low-pass filter 16 for controlling a delay and reversing circuit 18 which is arranged to control the transmitter tuning.

In operation, the signal from transmitter 10 is picked up by unit 14 concurrently with all other signals of sufficient strength within the broad receiver band (or within the receiver rejection). When the beat output between any given signal and that of transmitter 10 is of sufficiently low frequency to pass filter 16, the delay and receiving circuit 18 is energized to reverse motor 12, thus reversing the tuning of transmitter 10. After the reversal, the transmitter tuning sweeps across the frequency of the signal that caused motor reversal and in so doing causes another control pulse for unit 18 to be emitted from unit 14 through filter 16. This back-and-forth hunting continues as long as the signal from transmitter 10 continues to beat with, and thus cause detection of, the signal to be jammed. When that signal is interrupted, the tuning of the transmitter sweeps toward the next signal to be jammed or to the end of the band if no other signal is encountered. During the reverse sweep across the band in the latter event (without necessarily reversing the direction of rotation of the tuner), the same signal is detected again if its transmission is resumed and jamming will be renewed.

By judicious choice of components and proportions within unit 18, the range of sweep of transmitter 10 at opposite sides of a detected signal can be appropriately controlled. During the search-tuning of the transmitter, the sweep rate may be rapid and by design of the control circuit, the hunt-tuning can be made slow or it can be arranged to diminish progressively in amplitude. While this invention is not limited to the specific design of motor control circuit, one such circuit that can be used is illustrated in Fig. 2.

Figure 2:
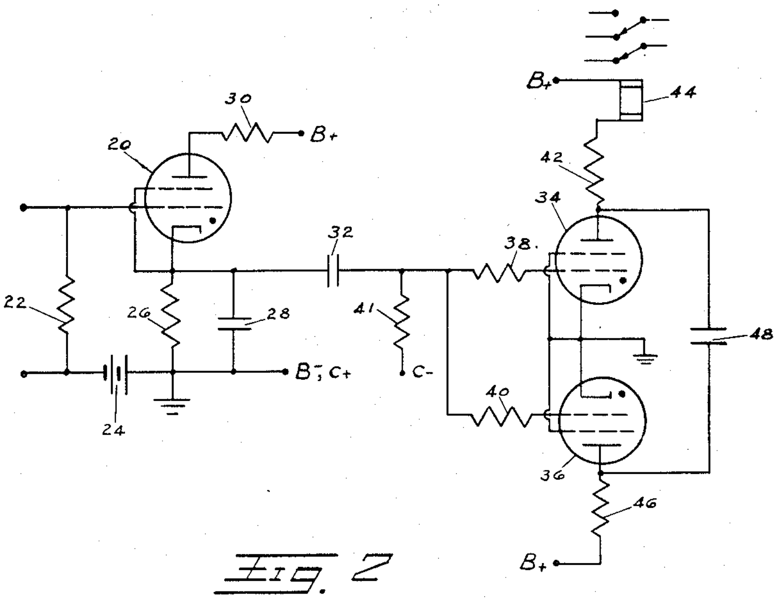
Fig. 2 is the diagram of a motor-reversing circuit.

The output pulse of unit 16 is arranged to fire thyratron 20 (Fig. 2). The signal is impressed across grid-return resistor 22. Bias supply 24 is connected in series with resistor 22 to complete the grid return of thyratron 20 to ground. Between the thyratron cathode and ground are resistor 26 and capacitor 28 connected in parallel to form a timing circuit. Current-limiting resistor 30 is provided between the plate of thyratron 20 and B+. When this thyratron is fired, capacitor 28 is promptly charged substantially to the full voltage of the B supply. This charge is allowed to leak off gradually through resistor 26 and only when the decay is sufficiently complete will a succeeding pulse from unit 16 be effective to trip the thyratron a second time. It is understood of course that the thyratron is extinguished when capacitor 28 is nearly fully charged, the current passed by resistor 26 being too low to maintain ionization.

Connected to the thyratron cathode is an output coupling capacitor 32 which couples the positive pulses suddenly developed at the cathode of thyratron 20 to the grids of thyratrons 34 and 36 through current-limiting resistors 38 and 40. These grids are suitably biased through resistor 41. Between B+ and the plate of thyratron 34 is a load resistor 42 in series with motor reversing relay 44. Between the plate of thyratron 36 and B+ is a load resistor 46. Capacitor 48 provides cross-coupling between the two thyratron plates. Thyratrons 34 and 36 the grids of which are arranged for control by a common input circuit and the plates of which are mutually coupled by capacitor 48 constitute a well-known form of scale-of-two counter, being here arranged to operate the reversing relay in place of a conventional register.

The operation of the circuit in Fig. 2 as it functions with the organization of Fig. 1 will now be described. As the transmitter tuning approaches a signal to be jammed, low-pass filter 16 will emit a pulse that fires thyratron 20. The pulse produced by thyratron 20 is coupled through capacitor 32 to both thyratrons 34 and 36. It may be assumed that one or the other of these thyratrons is in the conducting state. For example, let it be assumed that thyratron 36 is conducting and that the voltage at its plate is much lower than the voltage at the plate of thyratron 34 due to the drop in resistor 46. The input pulse has no effect on thyratron 36. The input pulse causes firing of thyratron 34 and suddenly its plate is driven from substantially B+ voltage to a considerably lower value. This negative shift causes a negative pulse to be impressed on the plate of thyratron 36 and drive that plate still further negative with respect to B+ than it was due to the voltage drop in resistor 46. Thyratron 36 is thereby extinguished. Firing of thyratron 34 also causes energization of previously deenergized relay 44, which reverses the motor circuit.

Inertia of the motor and the tuning capacitor or the like prevents immediate reversal and allows the tuning to sweep beyond the detected signal. A second pulse may be emitted by unit 16 as the transmitter tuning passes beyond that signal to the extent of the beat frequency to which unit 16 is predominantly responsive. This might cause renewed firing of thyratron 20 but for the delay of RC circuit 26, 28.

The motor inertia causes sweep tuning beyond the point at which the second pulse is developed at the input of thyratron 20. Its momentum having been absorbed, the motor reverses the direction of sweep tuning. As the center frequency of the signal is again approached, another pulse (at the time effective with respect to thyratron 20) fires thyratron 36 and quenches thyratron 34. This deenergizes relay 44 and reverses the motor contacts, but the motor continues in the same direction and passes to the opposite side of the signal in condition for renewed reversal. By making relay 44 slow-acting, the frequency of motor reversal and the range of hunt-tuning may be modified.

It will be observed that the transmitter is in constant operation, although its output may be boosted in power during the hunt-tuning in any convenient manner.

What is claimed is:

1. In combination, a tunable high-frequency transmitter for transmitting high-frequency radio signals and including an adjustable frequency-controlling element, a reversible motor normally actuatable continuously to adjust said frequency-controlling element, thereby normally to vary the operating frequency of said tunable transmitter over a relatively wide band of frequency values, a receiver having broad band response characteristics and arranged to receive signals from a distant transmitter and simultaneously to receive a portion of the output of said tunable transmitter, means in said receiver for converting said output portion and signals from said distant transmitter into intermediate-frequency signals having frequency values corresponding to the difference between the frequencies of said tunable and distant transmitters, a low-pass filter connected to pass intermediate-frequency signals below a predetermined frequency value, and means responsive to an output signal from said filter for reversing the direction of rotation of said motor.

2. In combination, a tunable transmitter for transmitting high-frequency radiant energy signals and including an adjustable frequency-controlling element, a reversible motor normally operable continuously to adjust said frequency-controlling element, thereby normally to vary the operating frequency of said tunable transmitter over a relatively wide band of frequency values, a receiver arranged to receive signals from a distant transmitter and simultaneously to receive a portion of the output of said tunable transmitter and for converting said signals into intermediate-frequency signals having frequency values variable in accordance with the variation in frequency of said tunable transmitter relative the frequency of said distant transmitter, filter means connected to pass intermediate-frequency signals below a predetermined frequency value, and means responsive to an output signal from said filter for reversing the direction of rotation of said motor.

3. Automatic tuning-control means for a high-frequency system including a tunable transmitter having an adjustable frequency-controlling element, reversible motor means normally operable continuously to adjust said frequency-controlling element, thereby normally to vary the operating frequency of said transmitter over a relatively wide band of frequency values, and a receiver having broad band response characteristics arranged to receive signals from a distant source and simultaneously to receive a portion of the output of said tunable transmitter, said tuning-control means comprising means in said receiver for deriving from said output portion and said signals from said distant source a control signal having a frequency value corresponding to the difference between the frequencies of said tunable transmitter and the distant source, a low-pass filter connected to pass said control signal when the frequency thereof is below a predetermined frequency value, and means responsive to an output signal from said filter for reversing the direction of rotation of said motor.

4. The automatic tuning-control means defined in claim 3 wherein said reversible motor means comprises a movable part coupled to said frequency-controlling element and arranged by virtue of the inertia of said part to overshoot the point at which the reversing control signal is applied to said motor means.

5. The automatic tuning-control means defined in claim 3 wherein said motor-reversing means comprises a delay circuit including a gas-filled discharge tube normally biased beyond cut-off and adapted to be fired by said control signal, a pair of gas-filled discharge tubes having respective input circuits connected in common to the output of the first-named tube, said pair of tubes being operable in mutually out-of-phase relation, and reversing-relay means in the plate circuit of one of said pair of gas-filled tubes and responsive to firing of said first gas-filled tube to cause reversal of said motor means.

OTTO H. SCHMITT.

References Cited in the file of this patent

UNITED STATES PATENTS

| Number | Name | Date |
|---|---|---|
| 1,944,315 | Clapp | Jan. 23, 1934 |
| 2,209,273 | Hills | July 23, 1940 |
| 2,287,925 | White | June 30, 1942 |
| 2,363,583 | Gilman | Nov. 28, 1944 |
| 2,375,133 | Polkinghorn | May 1, 1945 |
| 2,532,589 | Wu | Dec. 5, 1950 |